United States Patent
Jhanwar et al.

(10) Patent No.: US 12,106,083 B2
(45) Date of Patent: Oct. 1, 2024

(54) SYSTEM AND METHOD FOR DETERMINING APPLICABLE LIFECYCLE RULES IN LIFECYCLE MANAGEMENT SYSTEMS

(71) Applicant: InContact Inc., Salt Lake City, UT (US)

(72) Inventors: Ankita Jhanwar, Pune (IN); Darshan Ambhaikar, Pune (IN); Nishu Bansal, Pune (IN); Piyush Jain, Pune (IN); Sarang Panajkar, Pune (IN); Seemit Shah, Pune (IN)

(73) Assignee: InContact Inc., Salt Lake City, UT (US)

( * ) Notice: Subject to any disclaimer, the term of this patent is extended or adjusted under 35 U.S.C. 154(b) by 39 days.

(21) Appl. No.: 17/671,804

(22) Filed: Feb. 15, 2022

(65) Prior Publication Data

US 2023/0259342 A1    Aug. 17, 2023

(51) Int. Cl.
*G06F 9/44* (2018.01)
*G06F 8/60* (2018.01)
*G06F 8/71* (2018.01)

(52) U.S. Cl.
CPC . *G06F 8/60* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 9,239,717 B1* | 1/2016 | AlSaeed | G06F 8/65 |
| 2018/0203636 A1* | 7/2018 | Pulipaka | H04L 67/1097 |
| 2021/0216233 A1* | 7/2021 | Bolen | G06F 3/0604 |

OTHER PUBLICATIONS

Cloud.Google.com, "Object Lifecycle Management", Apr. 2020 (Year: 2020).*
Cloud.Google.com, "Cloud Storage", Jun. 2020 (Year: 2020).*
Linode, "Managing Objects with Lifecycle Policies", https://web.archive.org/web/20200927110328/https://www.linode.com/docs/platform/object-storage/how-to-manage-objects-with-lifecycle-policies/, Sep. 2020 (Year: 2020).*
https://docs.microsoft.com/en-us/azure/storage/blobs/lifecycle-management-overview?tabs=azure-portal, published Nov. 17, 2021.
https://cloud.google.com/storage/docs/lifecycle, "Object Lifecyle Management", printed Feb. 15, 2022.
https://docs.aws.amazon.com/AmazonS3/latest/userguide/object-lifecycle-mgmt.html, "Managing your Storage Lifecyle" printed Feb. 15, 2022.

* cited by examiner

*Primary Examiner* — Ted T. Vo
*Assistant Examiner* — Lanny N Ung
(74) *Attorney, Agent, or Firm* — PEARL COHEN ZEDEK LATZER BARATZ LLP

(57) ABSTRACT

A system and method for rule selection may include using one or more processors in a computer server, for a set of rules, each rule having one or more rule criteria, determining for each rule if the result of an interaction between interaction metadata and the one or more rule criteria includes one or more criteria. For each rule where the intersection includes one or more criteria, a complement result may be calculated between the result of the intersection and the rule criteria; and based on the complement result, wherein if the complement result is null, the rule may be selected.

19 Claims, 4 Drawing Sheets

SYSTEM AND METHOD FOR DETERMINING APPLICABLE LIFECYCLE RULES IN LIFECYCLE MANAGEMENT SYSTEMS

FIELD OF THE INVENTION

The present invention relates generally to lifecycle management in cloud based software deployment models. In particular, some embodiments relate to the selection of rules which affect storage and movement of data in for example, Contact Center as a Service (CCaaS) technologies.

BACKGROUND OF THE INVENTION

CCaaS technology is a contact center service that in some implementations is hosted or built on the cloud. Cloud herein refers to an internet-based provisioning of storage, computing power, or application software as a service. For example, CCaaS may enable companies which need contact center services to take advantage of state-of-the-art cloud compute resources without making large initial overhead investments into infrastructures. One of the most important benefits of CCaaS is the ability to allow companies to instantly scale contact center technologies to meet business and customer demands/needs. CCaaS cloud services may allow businesses to variably adapt to business needs, such as an ability to add or reduce the number of customer service agents as needed. It may cater to business sizes and may scale accordingly, such as avoiding the need for buying expensive servers and storage, allowing a business to pay for only what is needed or desired. Ease of software implementation, intrinsic product upgrades, on-demand troubleshooting may all be benefits provided by CCaaS technology.

Lifecycle management is an integral part of the CCaaS solution. Typically, in any CCaaS solution, data, primarily interactions, such as files or documents derived from voice recordings, screen recordings, video recordings, emails, chat transcripts, attachments, etc., may need to be appropriately handled. For example, for purposes of maintenance, development, update, or any other lifecycle management action, data such as interactions may need to be archived in certain locations or may need to be deleted or purged from one server and placed into another. The rules governing such actions are herein referred to as lifecycle rules. For example, assume in a CCaaS center, a customer service agent is handling a complaint case through a chat interaction with a customer, in which the customer is calling in about a complaint. Assume that after this interaction, the case was thereafter noted as resolved. This interaction (e.g. the data associated with the interaction, such as audio files, metadata, etc.) may need to be moved and archived for future reference, for example, if in the future the customer complains again, this interaction may be reviewed for inconsistencies. Lifecycle rules may allow for interactions to automatically be reviewed and placed in compliance with a company's internal policy, security goals, legislative compliance, or general housekeeping of a company's resources, e.g. moved, archived, deleted, etc.

Executing lifecycle rules on a large number of interactions is an arduous and complex task. Typically, lifecycle rules are processed in a flat manner, each lifecycle rule applied to a set of interactions after a pre-defined condition has been met. For example, a lifecycle rule (e.g. archival, deletion) may be applied to a batch of interactions after a predefined number of days has passed, or may be applied after a certain amount of interactions have accumulated. Otherwise, lifecycle rules may apply to interactions based on the file format, for example such as .txt or .wav file extensions. However, since lifecycle rules are typically processed in a flat manner and may not conform to the specifics or granularity of the interaction itself, the appropriate lifecycle rule applied is often in question. Often, multiple lifecycle rules may match (apply) to the same interaction (e.g. overlap) and the most suitable or desirable lifecycle rule should be chosen as the prevailing lifecycle rule. For example, lifecycle rules may be matched to data objects (e.g. interactions) in various ways, such as matching a key-prefix of the data object (e.g. partial match of object name), filtering data objects based on object tags, such as a key-value pair of the data object, or any other method of object or rule matching. However, current solutions ignore the priority or importance of one lifecycle rule over another, simply processing whichever lifecycle rule is applied first. Moreover, current lifecycle management systems are incapable of applying lifecycle rules to interactions stored on different cloud platforms. For example, lifecycle rules are typically built for a single cloud platform and may only function for interactions stored on the cloud platform, such as interactions stored in the Amazon Web Services (AWS) cloud platform. Thereby, there is a growing need for lifecycle management systems to support platform-independent compatibility and improved granularity, particularly as it pertains to lifecycle rules.

Therefore, it may be desirable to provide lifecycle rules which are platform-agnostic and flexible that overcome the limitations of prior art systems.

SUMMARY

Embodiments of the present invention may include a method for rule selection including, using one or more processors in a computer server, for a set of rules, each rule having one or more rule criteria, determining for each rule if the result of an intersection between interaction metadata and the one or more rule criteria includes one or more criteria. For each rule where the intersection includes one or more criteria, a complement result may be calculated between the result of the interaction and the rule criteria; and based on the complement result, wherein if the complement result is null, a set of rules may be selected.

In some embodiments, the rule is not selected if the complement result is non-null. An applicable rule may be selected based on a priority of the rules. In some embodiments, a rule with a maximum priority is the applicable rule.

In some embodiments, rules may be selected based on calculated results of logical operators. Embodiments of the invention may perform mathematical operations and may use set theory operators such as intersection and complement. Rules may be check for "if" a final valid match of rule criteria to interaction metadata exists.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

DETAILED DESCRIPTION

Figure 1:
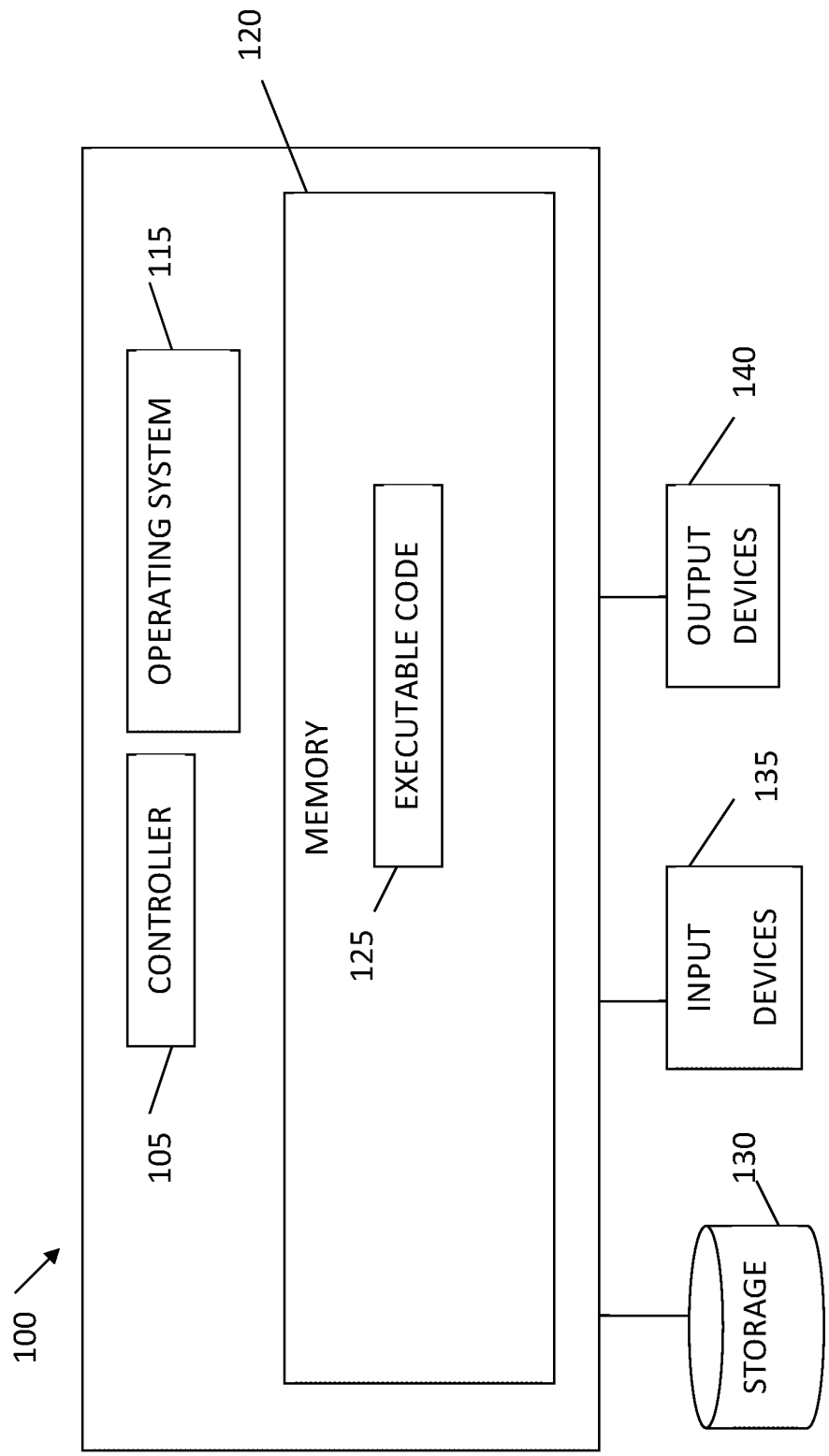
FIG. 1 is a high-level block diagram of an exemplary computing device which may be used with embodiments of the present invention.

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the invention may identify a "best-matching" lifecycle rule, or select an applicable lifecycle rule, for example, by identifying lifecycle rules best-matched with interaction metadata. Embodiments may filter lifecycle rules based on matching interaction metadata and lifecycle rule criteria to determine an Interaction Applicable Rule (IAR) and apply the IAR to interactions stored onto different cloud platforms. Embodiments may determine IARs for interactions with different combinations of metadata parameters by defining lifecycle rules with flexible rule criteria to support business use cases. Some embodiments may provide an improvement over prior art lifecycle management methods by not requiring lifecycle rules to be cloud platform specific, but may define lifecycle rules to be agnostic and independent of a cloud platform. Embodiments of the invention may define lifecycle rules and include lifecycle management logic, which may invoke appropriate cloud platform specific APIs and methods that are not cloud platform specific. Embodiments of the invention may improve the technology of data processing (e.g. handling large databases of computer data), and the technology of rule processing (e.g. determining which rules or procedures to apply to computer data).

By using interaction metadata, embodiments of the invention may define lifecycle rules based on the parameters associated with the interaction (e.g. metadata), providing a unique approach to manage the lifecycle of interactions. Embodiments may support multiple and overlapping lifecycle rules by applying a rule execution priority to each lifecycle rule. For example, multiple lifecycle rules may be selected for a single interaction where the prevailing lifecycle rule selected for execution has the highest priority.

Embodiments of the invention may define lifecycle rules specific to interaction metadata, such as lifecycle rule criteria which match or are similar to interaction metadata. For example, interactions metadata may define criteria such as "agent" and "team", which may be matched to a lifecycle rule defined with a corresponding "agent" and "team" criteria.

Embodiments of the invention may first determine a match between a set of rules and a set of interactions metadata (e.g. including computer data in one or more formats), and then, for matched rules, apply the rules to the interactions, e.g. by determining if an "if" portion of the matched rules applies to or covers the interaction metadata, signaling that the action or "then" portion of the rule should be executed. Embodiments of the invention may determine a match between lifecycle rule criteria and interaction metadata using for example logical operators. Logical operators, semantic or rule descriptions of sets, may be used in some embodiments to match corresponding sets of data. For example, logical operators such as an intersection or a complement may be used to match a pair of corresponding data. A complement, also known as a set difference, may be described as the set of elements which are members in a second set but are not members of the first set. For example, the complement of A and B is the set of all elements which are members of B that are not members of A. An intersection may be described as the set of elements which are members of both sets. For example, the intersection of A and B is the set of all elements which are members to both sets A and B.

FIG. 1 shows a high-level block diagram of an exemplary computing device which may be used with embodiments of the present invention. Computing device 100 may include a controller or processor 105 that may be, for example, a central processing unit processor (CPU), a chip or any suitable computing or computational device, an operating system 115, a memory 120, a storage 130, input devices 135 and output devices 140 such as a computer display or monitor displaying for example a computer desktop system. Each of modules and equipment such as lifecycle rules processor 208, storage services admin web application 206, IAR module 210, and other modules discussed herein may be or include, or may be executed by, a computing device such as included in FIG. 1, although various units among these modules may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions (e.g. code 125) to carry out a method as disclosed herein, and/or data such as low level action data, output data, etc.

Executable code 125 may be any executable code, e.g., an application, a program, a process, task or script. Executable code 125 may be executed by controller 105 possibly under control of operating system 115. For example, executable code 125 may be one or more applications performing methods as disclosed herein, for example those of FIGS. 3 and 4, according to embodiments of the present invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as user action data or output data may be stored in a storage 130 and may be loaded from storage 130 into a memory 120 where it may be processed by controller 105. In some embodiments, some of the components shown in FIG. 1 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Figure 3:
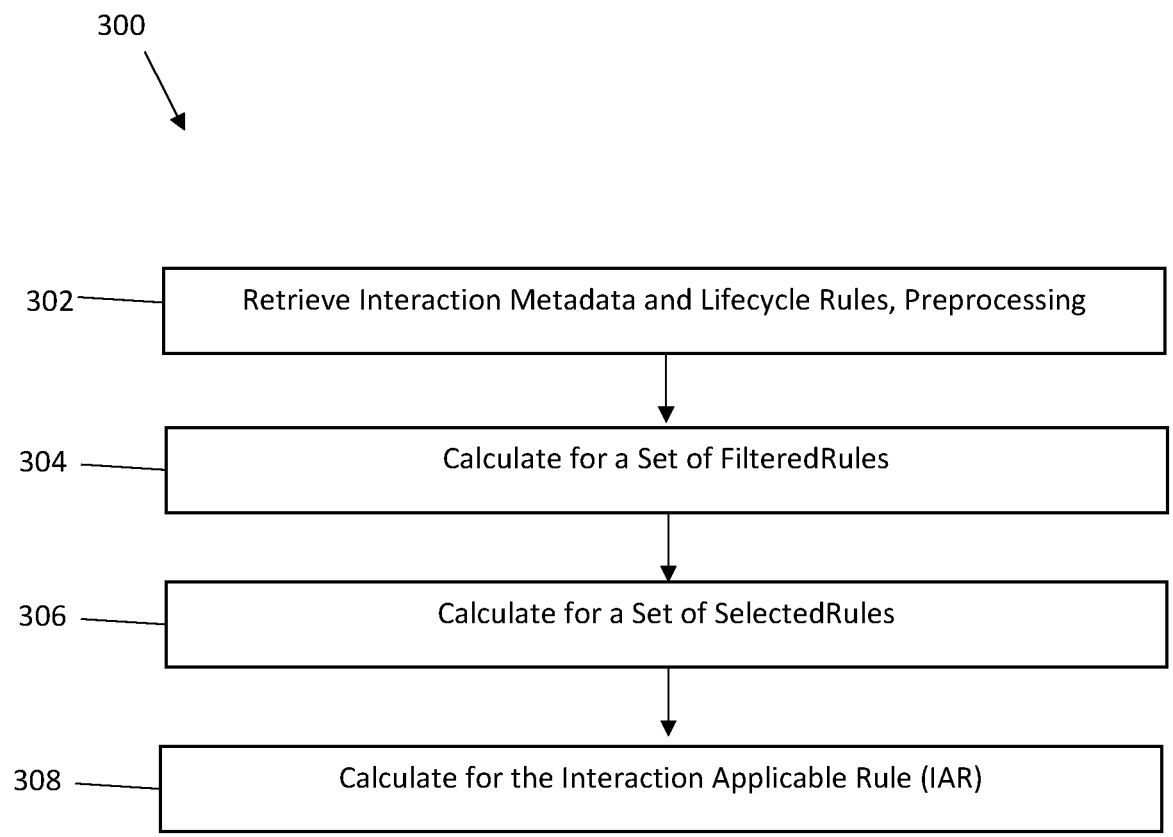
FIG. 3 is a flow diagram illustrating a method for calculating a potential best-match lifecycle rule according to embodiments of the present invention.
Figure 4:
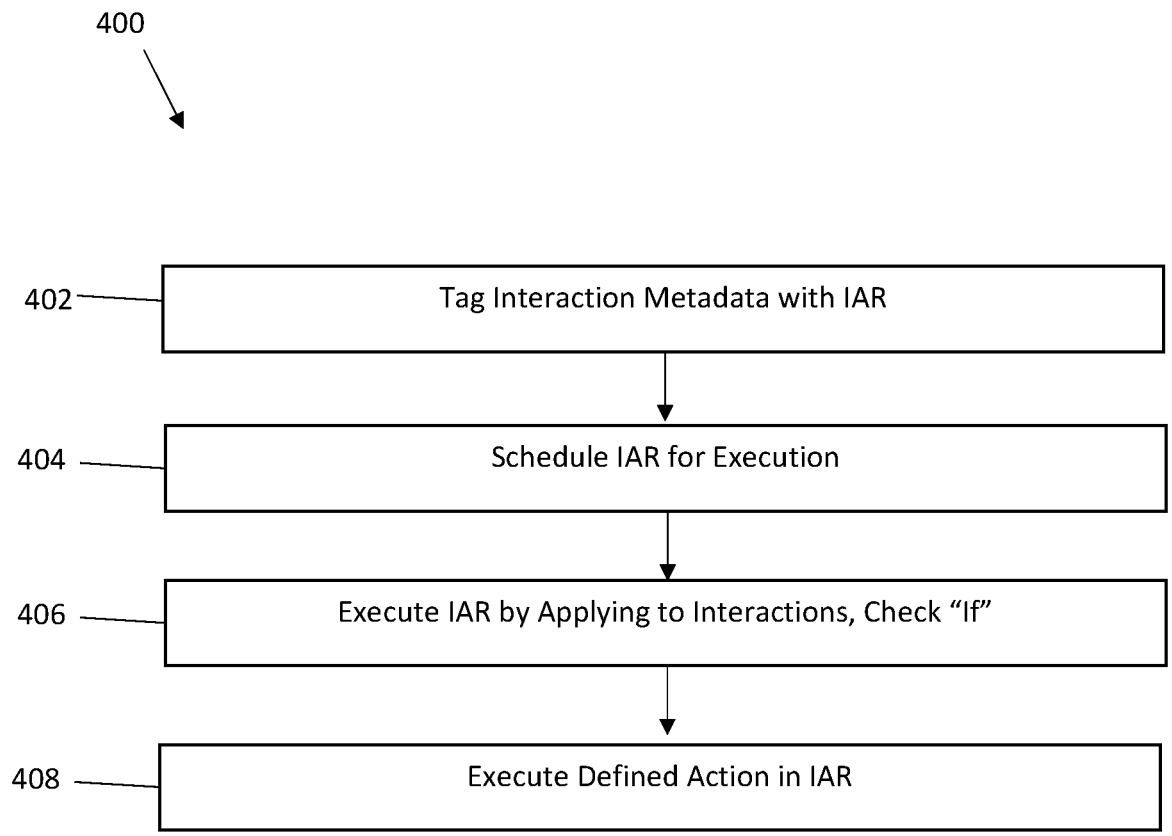
FIG. 4 is a flow diagram illustrating a method of execution of an IAR according to embodiments of the present invention It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

In some embodiments the operations of FIGS. 3 and 4 may be carried out using systems as shown in FIG. 1, in other embodiments other systems and equipment can be used.

Figure 2:
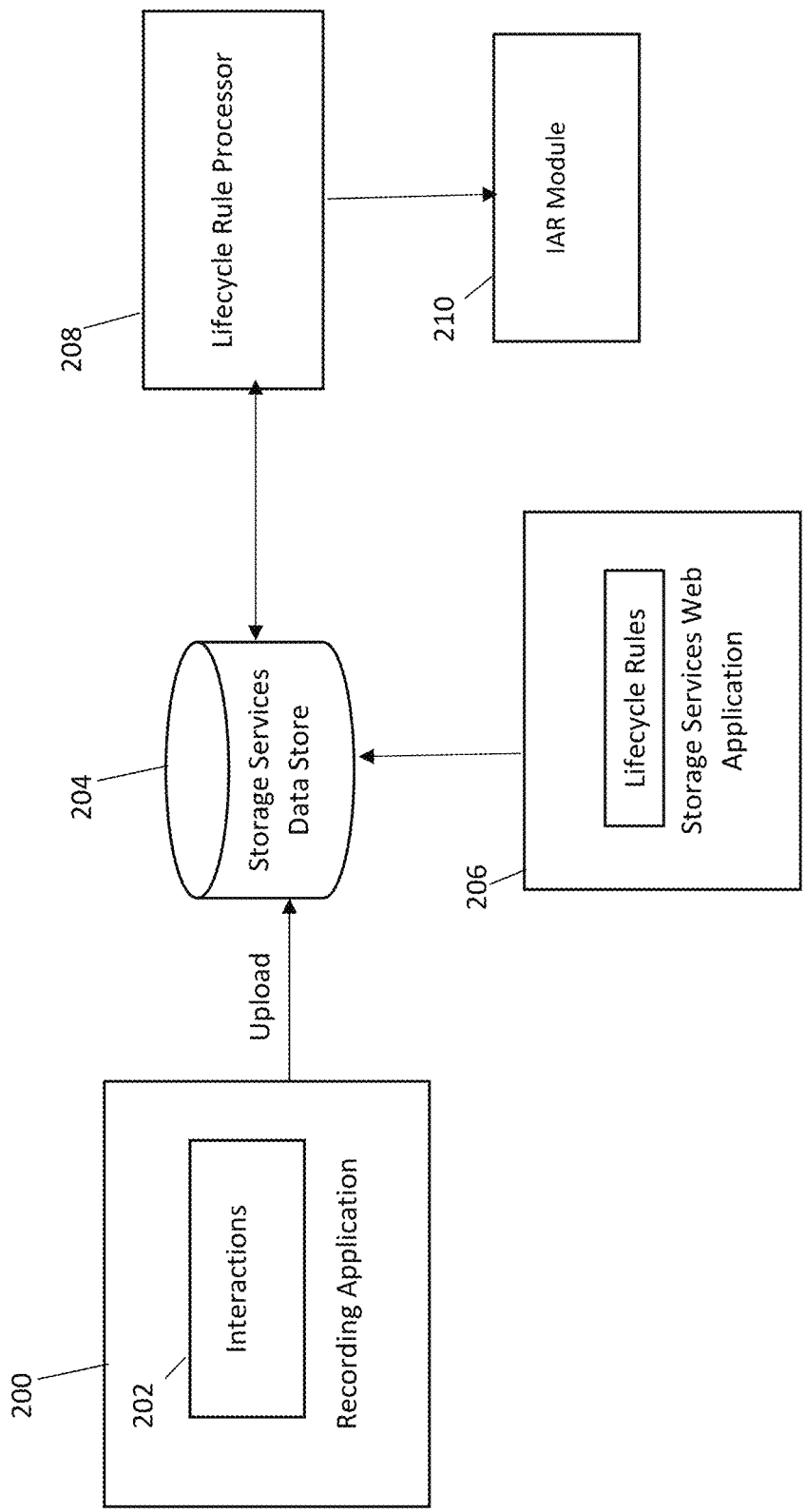
FIG. 2 illustrates a system for lifecycle management according to embodiments of the present invention.

FIG. 2 illustrates a system for lifecycle management according to embodiments of the present invention. While an example embodiment is explained in the context of CCaaS technology, other embodiments may improve rule processing and data handling (e.g. archiving, deleting) in other contexts. Rules or execution entities processing data other than interactions, such as documents, images, video files, etc., may be used. In FIG. 2, interactions 202, such as data representing conversations, telephone calls, interactive voice response (IVR), etc., in text, audio recording, video recording, graphic, or any other form, may be retrieved from a recording application 200, or a repository or database. For example, incoming calls to a CCaaS agent may be recorded by a recording application 200, and thereafter, the recording application may upload the recorded data to a data store 204. In the AWS cloud platform, interactions may be stored as objects. The storage of such objects may be in entities known as buckets. Data store 204 may contain information related to files, documents or interactions 202, such as the content or substance of interactions (e.g. recordings and/or transcripts of telephone calls) and interaction metadata. Data store 204 may also record and store the lifecycle event of interactions, for example, a log may be kept each time an action is executed, as described herein.

In the context of a CCaaS system, interaction metadata may be any form of identifying information or parameter (e.g. criteria) of the interaction, such as a telephone number (of a caller), a customer identification (of the caller), etc. Interaction metadata may include the name of an agent who handled an interaction, or the team the agent belonged to. Interaction metadata may be any form of data attached to interactions and is not limited in any respect to the above exampled parameters. Examples of some of the metadata which may describe interactions include:

Id: Private identifier of the interaction stored.
BusinessNo: Tenant/BusinessUnit to which the interaction belongs to.
Application: Recording application.
Campaign: Campaign to which Interaction belongs
FileName: The interaction file name.
ContactId: Unique ID of the interaction.
ContactStartDate: Date of the interaction.
FileType: Channel type for the interaction.
Agent: Agent who has attended the interaction.
Skill: Skill of the agent who attended the interaction.
Team: Team to which agent belongs to.
FileState: Defines if file is on active storage or on long-term storage
CreationDate: Date of the interaction.
Directory: File path of the interaction Typically, lifecycle management systems may allow users to define lifecycle rules which may be stored in data store 204 and may be used to manage the lifecycle of an interaction. Lifecyle rules may filter interactions satisfying certain attributes or criteria of lifecycle rules. When used herein, filter may mean selecting, from a set of data, some of the data, and ignoring, not using, or discarding, other of the data. Storage services admin web application 206 may be an administrative entity or framework responsible for the configuring or creating of lifecycle rules. Typically, lifecycle rules built on the cloud may be stored as objects in data store 204, but any form of data may be used. Lifecycle rules may have rule criteria or attributes, some of which may match interaction metadata. Attributes may include, for example:

File or Media Type: File formats for which the lifecycle rule is being defined. Media type may be client-based and need not be limited to any specific format. Interactions data may be grouped by media types, for example, a lifecycle rule may filter interactions, by selecting interactions which match the media type and ignoring the media type which does not match the media type. For example, based on the attribute of the media type of .WAV, a lifecycle rule may define a rule which only selects .WAV voice files to filter interactions, ignoring all other media types.

Rule Name: Name of the lifecycle rule which will be useful for the users to distinguish multiple lifecycle rules for the same media type. Rule names may be defined by clients to make it convenient for them to differentiate multiple rules of the same media type. For example, distinguishing lifecycle rules for a media type of 'email' may have rule names such as "Daily-Email-Archival" or "Delete_Email_After_100_days_Team1" etc.

Action: The action (e.g. execution) required to be performed on the document or interaction after a match of rule criteria to interaction metadata for the interaction occurs. After a match of lifecycle rules criteria to interaction metadata exists, the lifecycle rule may be applied to the interaction, lifecycle rule criteria may be checked for an "if" portion, described herein, and the action may be executed. Applying a lifecycle rule to an interaction may result in the action being carried out, or executed. Additional information may be included in the execution attribute, such as a storage class description describing different actions in different states of its storage lifecycle. The different states of an interaction lifecycle may include the stages or types of storage: for example, interactions may be stored differently at different phases of its lifecycle based on its age. For example, the current (active) storage action state which may, for example, be 5 years old, may have an action in a rule of "move to long term storage", and the long-term storage action state may be 10 years old, may have an action to "keep files forever". Typically, long-term storage may be less costly than active short-term storage, therefore, it may be beneficial in terms of cost to move from one storage to the other. The Amazon S3 service provides multiple storage classes for a range of different use cases. For example, Amazon S3 Glacier storage is used for long term data archiving, ideal for a storage action of "keep files forever". The Amazon services provide additional storage classes such as S3 Standard, S3 Intelligent-Tiering, S3 Glacier, S3 Outposts, each with a different use case. For example, an action may be to "copy to a Secure External Access (SEA) bucket" within AWS S3. The Action attribute may embody these different storage classes.

Start Date: Date on which lifecycle rule was activated.

After Number of Days: The time period, e.g. days, from the start date after which the desired action needs to be performed. Other time periods or measures may be used.

Applied Filter: The filter criteria for the rule, which may be considered the "if" portion. Interactions may have metadata or other descriptive data, associated with them, and this field contains the information to be used in filtering or determining if an interaction which should be processed by a given rule: e.g. if an interaction meets of matches the rule's filter criteria, the "if" portion of the rule is met, and the action of the rule is taken or executed on the interaction.

Status: Current status of the lifecycle rule. Only rules which are in active state, may be processed. Active state may be one of the states which denotes a lifecycle rule which is in force. For example other status states may be: pending, completed, scheduled, etc.

Rule Priority: The priority of the lifecycle rule. Lifecycle rules may be defined with precedence, such that one lifecycle rule supersedes another, e.g. is executed or applied before rules with lower priority. This may be an integer defining the level of importance of the lifecycle. For example, lifecycle rules may be defined from a priority of 1 to 10, with 1 being the lowest priority and 10 being the highest priority. Therefore, if multiple lifecycle rules overlap and are applicable to one interaction, the selection of the lifecycle rule may depend on the lifecycle rule with highest priority. For businesses, critical lifecycle rules are executed based on the priority, ensuring interactions of higher business interests are processed first.

RuleID: An identifier for the rule, may be an integer.

TenantID: Otherwise known as a business number, an identifier of the entity to which the lifecycle rule belongs.

ModifyDate: Date interaction last modified.

Archive: This may be a map

FileState: Defines if the interaction is on active storage or long-term storage.

In some embodiments, lifecycle rules may be cloud platform specific, such that they may be compatible with and work with specific cloud APIs. For example, multiple variations of a lifecycle rule may be created, each defining some common rule criteria, but additionally may have different rule criteria based on the cloud platform used. For example, a rule criteria might indicate a storage service criteria where "S3" indicates the AWS simple storage service whereas "blob" indicates Microsoft Azure storage services. Both lifecycle rules may be the same or similar rule, but each may be only applicable to a specific cloud platform. In other embodiments, lifecycle rules may be adapted to work with multiple cloud platforms. For example, a set of common rule criteria applicable to both cloud platforms may be created, such that the lifecycle rule may be applicable regardless of the cloud platforms.

IAR module 210 may be a module responsible for applying lifecycle rules or policies to interactions 202 stored in data store 204, searching for a potential best-matched lifecycle rule (e.g. IAR) using interaction metadata and comparing to lifecycle rule attributes and/or rule criteria. IAR module 210 may retrieve from data store 204 interactions and associated metadata of interactions in addition to lifecycle rules and associated rule criteria. The IAR module 210 may calculate logical operations between lifecycle rule criteria and interaction metadata to filter lifecycle rules to determine an IAR, applying to and tagging the interaction.

Lifecycle rules matching the attributes and/or criteria of the interactions 202 may be selected as an IAR (e.g. by IAR module 210), and thereafter the IAR may be scheduled for processing or execution by lifecycle rules processor 208. Lifecycle rules processor 208 may check for lifecycle rule criteria in an "if" portion, and execute the action associated with the IAR tagged to the interaction. Lifecycle rules processor 208 may execute IARs in an incremental approach using time-based scheduling for selected IARs. The interactions associated or tagged with the processed IARs may execute the action as defined by the IARs, e.g. to archive, delete, etc. the interactions matching the IARs. In some embodiments, the execution of lifecycle rules may be processed or executed by a dedicated executor module separate from the lifecycle rules processor 208, responsible for executing the rules under the instruction of the lifecycle rules processor 208.

The actual action, e.g. moving interaction to long-term storage, deleting the interaction, etc. may be performed in the data store 204. A storage system such as data store 204 may include a persistent store to have the object stored and retrieved. The persistent store may be on premises (e.g. disk store) or, elsewhere such as public cloud systems (e.g. the AWS S3 Simple storage services or the Microsoft Azure blob storage systems).

FIG. 3 is a flow diagram illustrating a method 300 for calculating a potential best-match lifecycle rule (e.g. IAR) according to embodiments of the present invention. The example method as discussed in FIG. 3, in some embodiments, may be performed by for example, the IAR module 210 as described in FIG. 2. At operation 302, data is first retrieved from the data stores and preprocessed (e.g. filtered), for example, by the IAR module 210. The retrieved data may contain interactions and their associated metadata, in addition to a set of lifecycle rules each with an associated set of rule criteria. In some embodiments, interaction data itself may not be retrieved, but only the metadata of the interactions. The retrieved data may first be pre-processed to select an interaction and an associated set of metadata and thereafter processed to determine a set of lifecycle rules for the interaction. To retrieve an interaction from data stores, a query operation may be performed on the data stores. An example query is provided below to select an interaction, retrieving only the metadata associated with the interaction:

Example Interaction Metadata Query:

---
Select * from InteractionMetadata WHERE TenantId = 1316000992
AND InteractionId = "9e864b80-a2a0-4150-9d19-6d85127c171d"
---

Outcome: The query will return list of metadata parameters associated with the interaction:

TABLE 1

Sample Interaction Metadata

```
{
    "InteractionId": "054d28c1-05f0-4ea7-b7f4-c799650435e4",
    "TenantId": 1316000992,
    "Metadata": {
        "ContentType": "application/json",
        "SegmentId": "c2e04b2a-bfbe-4e59-af77-fb12faee1b11",
        "FileName": "call-rec-166843.wav",
        "ContactId": "87435",
        "Application": "MCR",
        "Directory": "562334.wav",
        "participants": [{
            "Agent": "65340",
            "Group": "5",
            "Skill": "1509",
            "Campaign": "2",
            "Dnis": "842536",
            "UserId": "de6c42c8-479e-4b69-a40e-fe323d16dea6",
            "ParticipantType": "AGENT",
            "Team": "7",
            "Ani": "638486"
        }]
    },
    "Revision": 0
}
```

The above example query returns a set of associated metadata for an interaction with a TenantId=1316000992 and InteractionId of "9e864b80-a2a0-4150-9d19-6d85127c171d". Any combination of the metadata parameters may be used to determine an interaction. Although during preprocessing, multiple interactions and its associated metadata may be selected by a single query. For demonstrative purposes, an assumption is made where only one interaction's associated metadata is returned. However, the process described herein may be executed in parallel with each interaction determined for an IAR simultaneously.

For the selected interaction and associated metadata, additional preprocessing may select a set of lifecycle rules from the data stores which are applicable to the selected interaction. To retrieve a set of lifecycle rules, a query operation may be performed on the data stores. An example query is provided below to select a set of lifecycle rules applicable to the above interaction:

Example Lifecycle Rules Query:

---
Select * from LifeCycleRules WHERE TenantId= 1316000992
---

Outcome: The query will return a set of lifecycle rules for the interaction.

TABLE 2

Sample Lifecycle Rule

```
{
    "RuleId": "71039424-b7f1-4e02-bd24-26eb9891bf8e",
    "TenantId": 1316000992,
    "Priority": "P1",
    "RuleCriteria": {
        "Agent": ["65340"],
        "Skill": ["1509"],
        "Team": ["7"],
        "Dnis": ["842536"]
    },
    "StartDate": 1639440000000,
    "ModifyDate": 1639482443033,
    "Description": "P1 Rule",
    "InteractionType": [1, 12],
    "IsDisabled": false,
    "RuleName": "Callrecording-P1-Rule",
    "Active": {
        "Actions": {
            "Action": "Archive",
            "PerformActionAfterDays": 0
        }
    }
}
```

The above example query returns a set of lifecycle rules each with an associated set of rule criteria which are pertinent to the set of interaction metadata. For example, the above query returns the set of lifecycle rules with the same TenantId=1316000992 as the selected interaction. There may be multiple lifecycle rules returned, each applicable to the selected interaction. For additional granularity, a query may specify additional criteria within the query, for example, by adding criteria using an 'AND' operand. For example, to narrow the resultant set of lifecycle rules, a query might select lifecycle rules where TenantId=1316000992 AND InteractionType="CallRecording" such that more specific and pertinent lifecycle rules may be returned.

At operation 304, the resultant set of interaction metadata and the resultant set of lifecycle rules each with a set of rule criteria may be calculated for a set of filtered rules. Each lifecycle rule may have a set of rule criteria which may be compared to the set of interaction metadata, as preprocessed in operation 302. For example, in the above example, the resultant set of interaction metadata associated with an InteractionId of "9e864b80-a2a0-4150-9d19-6d85127c171d" and TenantId=1316000992 may be compared with each set of rule criteria associated with each lifecycle rule returned by the query with TenantId=1316000992. Example Formula 1 may be used to calculate the set of filtered rules:

Formula 1

$$FilteredRules\ (FR) = \sum_{k=1}^{N} \left( (RuleCriteria_k \cap Metadata) \sim RuleCriteria \right)$$

In Formula 1, each set of rule criteria (e.g. Table 2) from k=1 to N may be calculated for an intersection with the interaction metadata (e.g. Table 1). In mathematics, particularly set theory, an intersection ($\cap$) denotes the set of all elements that belong to both sets. Therefore, for a set of N lifecycle rules, with each rule having a set of one or more rule criteria, an intersection may be calculated between the one or more rule criteria and the set of interaction metadata. For example, interaction metadata may be a set of one or more key value pairs such as "Agent Name=Joe" or "Cloud Platform=AWS". For a lifecycle rule, the lifecycle rule may define one or more rule criteria with the same key value pairs "Agent Name=Joe" and "Cloud Platform=AWS". Therefore, this may result in partially matched criteria. The resultant set of partially matched criteria from the intersection results is derived from the set of elements existing in both the set of interaction metadata and the set of rule criteria. If there is no intersection result between the compared sets, and thus no match, the lifecycle rule may be excluded or discarded. The intersection result may be a partial match, such that there still may be non-matched rule criteria which does not match any interaction metadata.

To calculate the set of filtered rules, the resultant set of partially matched rule criteria (e.g. intersection result) may be compared to the set of rule criteria, and a relative complement calculated. In set theory mathematics, a relative complement (~) denotes the set of elements, given that A~B, that are in B but not in A. Therefore, according to Formula 1, this results in the set of elements which are in the set of rule criteria but not in the set of the intersection result of the rule criteria and the set of interaction metadata. If there is no complement between the compared sets, an empty or null set may be returned. This process may be repeated until all of the set of lifecycle rules is calculated. Shown in Table 3 is an example calculation for a set of filtered rules:

TABLE 3

| Rule Priority | Rule Criteria | Metadata | Intersection Result | Complement Result | FilteredRule |
|---|---|---|---|---|---|
| P3 | R1{M1, M3} | {M1, M2, M5} | {M1} | {M3} | R1{M3} |
| P4 | R2{M1, M2} | {M1, M2, M5} | {M1, M2} | { } | R2{ } |
| P2 | R3{M1, M2, M5, M6} | {M1, M2, M5} | {M1, M2, M5} | {M6} | R3{ } |
| P6 | R4{M1, M2, M5} | {M1, M2, M5} | {M1, M2, M5} | { } | R4{ } |
| P1 | R5{M1, M2, M5} | {M1, M2, M5} | { } | { } | R5{ } |
| P5 | R6{M10} | {M1, M2, M5} | { } |  | Discarded |

As exampled in Table 3, six different lifecycle rules (R1-R6) were selected as applicable to a selected interaction and its associated set of metadata, for example, as determined according to operation 302 of the method. The example set of interaction metadata has three different elements (e.g. key-value pairs) denoted as M1, M2, and M5, and each of the lifecycle rules may each have a set of one or more rule criteria (e.g. key-value pairs). For example, lifecycle rule R1 has a set of rule criteria with elements M1 and M3. For example, as shown in row 1 of Table 3, the intersection result is the set of elements common to both the set of rule criteria (M1, M3) and the set of interaction metadata (M1, M2, M5), therefore the intersection result is (M1). The complement result is the set of elements in the set of rule criteria that is not in the set of the intersection result. Therefore, for row 1, this is the set of elements in the rule criteria (M1, M3) but not in the intersection result (M1), thus the complement result is (M3). Shown in row 6 is an example of a null intersection result, as the set of rule criteria (M10) has no commonalities with the set of interaction metadata (M1, M2, M5), such that the intersection result is null or empty. Shown in row 2 is an example of a null complement result, as the set of rule criteria (M1,M2) does not have an element which does not exist in the intersection set (M1,M2), such that the complement result is null or empty.

At operation 306, the filtered rules may be calculated for a set of selected rules. Selected rules may be calculated according to Formula 2 below:

$$SelectedRules(SR) = \sum_{k=1}^{N} (FR_k = \text{Null}) \quad \text{Formula 2}$$

In example Formula 2, the N filtered rules (e.g. each with a complement result), may be filtered, excluding or removing the filtered rules with non-null or non-empty complement results. Thus if the complement result is null, the set of rules which have null complement results may be selected; for any rule where the complement result is not null, that rule is not selected. This operation may eliminate the partially matching lifecycle rules of the set of filtered rules, such that the selected rules are an exact match. For example, Table 4 shows example selected rules which are discarded or selected from filtered rules based on the complement result of Table 3, resulting in only the rules which are an exact match.

TABLE 4

| Rule Priority | FilteredRule | Null/Empty | SelectedRules |
|---|---|---|---|
| P3 | R1{M3} | False | Discarded |
| P4 | R2{ } | True | Selected |
| P2 | R3{M6} | False | Discarded |

TABLE 4-continued

| Rule Priority | FilteredRule | Null/Empty | SelectedRules |
|---|---|---|---|
| P6 | R4{ } | True | Selected |
| P1 | R5{ } | True | Selected |

As shown in Table 3 and Table 4 lifecycle rules R1 and R3 resulted in non-null and non-empty complement results, thereby not being an exact match of rule criteria. Therefore, lifecycle rules R1 and R3 are discarded and excluded whereas lifecycle rules R2, R4, and R5 are the filtered selected rules.

At operation 308, the selected rules may be calculated for an IAR. As according to some embodiments of the invention, lifecycle rules may be defined with a priority. The IAR may be selected as the selected rule with the maximum priority, according to example Formula 3.

$$MAX(Priority(SR)) \quad \text{Formula 3}$$

According to Formula 3 and Table 2, the selected rules R2, R4, and R5 have priority P4, P6, and P1 respectively. Therefore, since R5 has priority P1 (e.g. max priority, assuming P1=Highest, P10=Lowest), R5 may be selected as the IAR. Therefore, after one or more lifecycle rules criteria matches the interaction metadata, an IAR may be selected.

Referring now to FIG. 4, shown is a method 400 illustrating the execution of an IAR according to embodiments of the present invention. At operation 402, the IAR (e.g. determined from the method of FIG. 3) may be used to tag the associated interaction. For example, the interaction metadata from which the IAR was derived may be tagged with the IAR. The tagged interaction metadata may be stored in the data store, for example, by a PUSH operation appending interaction metadata with details of the IAR. In other embodiments, an object may be created linking the interaction to the IAR. For example, embodiments may include an object linking an IAR's "RuleID" parameter value to an interaction's "InteractionID" parameter value without modifying interaction metadata. Such an object may be retrieved during lifecycle rule scheduling/execution, described herein.

At operation 404, an IAR may be scheduled for execution. The interactions may be processed in an incremental approach, such that the lifecycle rules may be executed periodically using time-based scheduling to process the interactions for selected lifecycle rules.

At operation 406, a lifecycle rules executor (e.g. Lifecycle rules processor 208 of FIG. 2) may begin to apply an IAR by retrieving the interactions tagged with the IAR details stored in the data store. At this point, an IAR may check "if" a final valid match of interaction metadata to IAR rule criteria is present. Often, the state or status of an interaction changes with time or may be updated with different information as time progresses. Therefore, interactions tagged with IARs may need to be validated during an "if" portion of the execution. Matches may be performed on the IAR and interaction metadata to ensure that the IAR is still valid and enforceable on the current state of the interaction metadata. IARs selected for execution may have the relevant rule criteria applied against relevant interactions, and only if there is a valid match between rule criteria and interaction metadata, the IAR execution may continue. For example, an interaction may have been tagged with an IAR with an action of "archiving to short-term storage". However, assume a substantial amount of time has elapsed since the IAR was tagged to the interaction such that the action of "archiving to short-term storage" action is no longer appropriate. Instead, a required action may be stored to a "long-term storage archive". Therefore, a final check "if" a valid match exists may be executed before the final execution of the IAR (e.g. execution of the action on the interaction). "If" the final check is invalid, the interaction may be ignored, or in some embodiments, reevaluated for an IAR. In some embodiments, once an interaction is tagged with an IAR, the IAR may always be valid for a specific time period. For example, an IAR may specify a rule which applies to interactions created at most 5 days ago, and the action as defined in the IAR applies to all interactions created within a month (e.g. 30 days), therefore it may be guaranteed for 25 days that this IAR is valid for any interaction that was tagged with the IAR.

At operation 408, rule execution may continue, and the action as defined by the IAR may be executed on the interaction. For example, an IAR might define an archiving action, moving the interactions to a specific folder. The action may be executed on the interaction and the process may end.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for rule selection, the method comprising using one or more processors in a computer server:

recording, by one or more of the processors, one or more interactions, the interactions comprising audio data;

storing, by one or more of the processors, one or more of the interactions and interaction metadata associated with one or more of the interactions as objects in a data store;

for a set of rules, each rule having one or more rule criteria, determining for each rule if the result of an intersection between the interaction metadata of one or more of the interactions and the one or more rule criteria includes one or more criteria;

for each rule where the intersection includes one or more criteria, calculating a complement result between the result of the intersection and the rule criteria;

selecting a set of rules having a null complement result; and creating, by one or more of the processors, a data object linking the selected rules to one or more of the interactions, the data object comprising a rule parameter value linked to an interaction parameter value, the linking performed without modifying the interaction metadata;

wherein to execute a rule the data object is referenced to determine the rule to be executed.

2. The method of claim 1, the method further comprising: if the complement result is non-null, not selecting the rule.

3. The method of claim 1, wherein for each selected rule of the set of rules, an applicable rule is selected based on a priority of the rules.

4. The method of claim 3, wherein the rule with a maximum priority is the applicable rule.

5. The method of claim 1, wherein if the result of the intersection is null, the rule is not selected.

6. The method of claim 1, comprising using a selected rule of the set of rules to tag an interaction associated with the interaction metadata to execute an action of the selected rule.

7. A system for rule selection, the system comprising:
a memory; and
a processor, configured to:
record one or more interactions, the interactions comprising audio data;
store one or more of the interactions and interaction metadata associated with one or more of the interactions as objects in a data store;
for a set of rules, each rule having one or more rule criteria, determine for each rule if the result of an intersection between the interaction metadata of one or more of the interactions and the one or more rule criteria includes one or more criteria;
for each rule where the intersection includes one or more criteria, calculate a complement result between the result of the intersection and the rule criteria;
select the rule having a null complement result; and
create a data object linking the selected rules to one or more of the interactions, the data object comprising a rule parameter value linked to an interaction parameter value, the linking performed without modifying the interaction metadata; wherein to execute a rule the data object is referenced to determine the rule to be executed.

8. The system of claim 7, wherein the processor is configured to: if the complement result is non-null, not select the rule.

9. The system of claim 7, wherein the processor is configured to, for each selected rule of the set of rules, select an applicable rule based on a priority of the rules.

10. The system of claim 9, wherein the rule with a maximum priority is the applicable rule.

11. The system of claim 7, wherein if the result of the intersection is null, the rule is not selected.

12. The system of claim 7, wherein the processor configured to: use a selected rule of the set of rules to tag an interaction associated with the interaction metadata to execute an action of the selected rule.

13. A method for selecting rules, the method comprising using one or more processors in a computer server:
recording, by one or more of the processors, one or more interactions, the interactions comprising audio data;
storing, by one or more of the processors, one or more of the interactions and interaction metadata associated with one or more of the interactions as objects in a data store;
for a set of rules, each rule having one or more rule attributes, determining for each rule if commonalities exists between the interaction metadata of one or more of the interactions and the one or more rule attributes;
for each rule where there is one or more commonality, calculating a complement result between the result of the commonalities and the rule attributes;
selecting a set of rules having a null complement result; and
creating, by one or more of the processors, a data object linking the selected rules to one or more of the interactions, the data object comprising a rule parameter value linked to an interaction parameter value, the linking performed without modifying the interaction metadata; wherein to execute a rule the data object is referenced to determine the rule to be executed.

14. The method of claim 13, the method further comprising: if the complement result is non-null, not selecting a rule.

15. The method of claim 13, wherein for each selected rule of the set of rules, an applicable rule is selected based on a priority of the rules.

16. The method of claim 15, wherein the rule with a maximum priority is the applicable rule.

17. The method of claim 13, wherein if the result of the commonalities is null, the rule is not selected.

18. The method of claim 13, comprising using a selected rule of the set of rules to tag an interaction associated with the interaction metadata to execute an action of the selected rule.

19. A method for rule selection, the method comprising using one or more processors in a computer server:
recording, by one or more of the processors, one or more interactions, the interactions comprising audio data;
storing, by one or more of the processors, one or more of the interactions and interaction metadata associated with one or more of the interactions as objects in a data store;
for a set of rules, each rule having one or more rule criteria, determining for each rule if the result of an intersection between the interaction metadata of one or more of the interactions and the one or more rule criteria includes one or more criteria;
for each rule where the intersection includes one or more criteria, calculating a complement result between the result of the intersection and the rule criteria;
selecting a set of rules having a null complement result; and
creating, by one or more of the processors, a data object linking the selected rules to one or more of the interactions, the data object comprising a rule parameter value linked to an interaction parameter value, the linking performed without modifying the interaction metadata;
wherein at least one of the selected rules comprises a plurality of actions, each of the plurality of actions corresponding to a storage state of an interaction.

* * * * *